United States Patent [19]

Petersen et al.

[11] Patent Number: 4,860,784
[45] Date of Patent: Aug. 29, 1989

[54] NON-RISING STEM VALVE ASSEMBLY AND METHOD OF REPLACING A PERMANENT SEAL

[75] Inventors: James A. Petersen, Greensboro; Timothy G. Crater, Winston-Salem, both of N.C.

[73] Assignee: Engineered Controls International, Inc., Elon College, N.C.

[21] Appl. No.: 295,742

[22] Filed: Jan. 11, 1989

[51] Int. Cl.⁴ .................. F16K 43/00; F16K 41/00
[52] U.S. Cl. ................................. 137/315; 251/214; 251/267; 251/270; 251/330
[58] Field of Search ............... 137/315, 214; 251/221, 251/223, 225, 266, 261, 270, 273, 274, 330

[56] References Cited

U.S. PATENT DOCUMENTS

| | | | |
|---|---|---|---|
| 574,881 | 1/1897 | Cook | 251/270 |
| 682,688 | 9/1901 | Hart | 251/267 |
| 903,436 | 11/1908 | Benzenhafer | 251/330 |
| 969,576 | 9/1910 | Turner | 251/270 |
| 1,085,054 | 1/1914 | Marsh | 251/270 |
| 1,452,811 | 4/1923 | Mueller | 251/330 |
| 3,006,361 | 10/1961 | Reinemann | 251/270 |
| 3,082,786 | 3/1963 | McLean | 137/454.5 |
| 3,327,992 | 6/1967 | Billeter et al. | 251/267 |
| 3,912,221 | 10/1975 | Fenster et al. | 251/266 |
| 3,957,245 | 5/1976 | Daghe | 251/267 |
| 4,381,797 | 5/1983 | Neff | 137/599 |

FOREIGN PATENT DOCUMENTS 696523 10/1964 Canada .............................. 251/267

*Primary Examiner*—George L. Walton
*Attorney, Agent, or Firm*—Sixbey, Friedman, Leedom & Ferguson

[57] ABSTRACT

The non-rising stem valve assembly includes a valve body having an inlet and an outlet and a bonnet member securely attached to the valve body which defines a tubular passageway. A valve stem extends through this tubular passageway and has a lower valve portion axially displaceable relative thereto and positioned between the inlet and outlet. A retaining ring is provided for securing the valve stem against inward movement relative to the bonnet member and an inwardly projecting flange on the bonnet member is provided for securing the valve stem against outward movement relative to the bonnet member. A packing assembly is removably secured to the bonnet member for sealing the valve assembly. An axially displaceable seal is provided in a cavity formed between the flange and the upper surface of the lower valve portion which is axially movable within the cavity by the lower valve portion. This axially displaceable seal forms a temporary seal which may be selectively formed between the valve stem and the bonnet member for temporarily sealing the valve assembly and allowing the packing assembly to be replaced when necessary without decommissioning the valve assembly.

11 Claims, 3 Drawing Sheets

4,860,784

NON-RISING STEM VALVE ASSEMBLY AND METHOD OF REPLACING A PERMANENT SEAL

TECHNICAL FIELD

This invention relates to non-rising stem valves for use in a fluid distribution system, and more particularly, this invention relates to a novel non-rising stem valve which facilitates the replacement of the valve stem seal without the need of decommissioning the valve.

BACKGROUND ART

Non-rising stem valves for use in distribution systems are known in the prior art. These non-rising stem valves are provided with a stem packing which, by compression and internal pressure, effects a seal and contains the product under pressure therein. To replace this stem packing, the valve and the subsequent distribution system must be taken out of service to avoid any major loss of product. One solution to the problem of downtime is set forth in U.S. Pat. No. 3,912,221 to Fenster et al issued Oct. 14, 1975, which discloses a stem seal and retainer for a gate valve. This gate valve is of the non-rising type with a seal being provided between the stem and bonnet of the valve. A cartridge type seal unit is held in place by the operating nut and the stem and gates are held in the raised position by a snap ring. The cartridge type seal unit may be removed by removing the operating nut and lifting out the seal cartridge.

The non-rising valve described above includes a secondary seal to prevent loss of product while the primary seal is being replaced. This allows the primary seal to be replaced while the valve is in the operating condition. This redundant secondary O-ring seal is continuously in effect by way of compression between the non-rising stem and the bonnet, and internal pressure exerted by the product line. These forces which continuously act on the secondary O-ring seal subject this seal to constant wear during the opening and closing of the valve, and when such secondary seal requires replacement due to the stresses which are continuously applied thereto, the valve and distribution system must be decommissioned to avoid loss of product during this replacement.

OBJECT OF THE INVENTION

It is an object of the present invention to provide a non-rising stem valve wherein removal of the packing nut and replacement of the O-ring may be accomplished without the decommissioning of the non-rising stem valve and the associated distribution system.

It is a further object of the present invention to provide a non-rising stem valve having a secondary seal which is engaged only when replacement of the primary O-ring seal is being performed.

Another object of the present invention is to provide a non-rising stem valve incorporating the above features, which may be retrofit into already existing valve bodies.

These objects and others are realized according to the invention by providing a non-rising stem valve assembly including a valve body having an inlet and an outlet that is capable of accommodating a non-rising stem valve. The non-rising stem valve includes a bonnet member securely attached to the valve body which forms a tubular passage way. A valve stem extends through this tubular passageway and has a lower valve portion axially displacable relative thereto, with the lower valve portion being positioned between the inlet and outlet. A retaining ring is provided for securing the valve stem against inward movement relative to the bonnet member and an inwardly extending radial flange is provided for securing the valve stem against outward movement relative to the bonnet member. A packing nut is provided for sealing the valve assembly. The packing nut has an interior surface and an exterior surface with a first O-ring seal being provided on the interior surface and a second O-ring seal being provided on the exterior surface. A third axially displacable seal is provided which rests on an upper surface of the lower stem and is axially movable with the lower stem. The first and second O-ring seals form permanent seals and seal the valve assembly during normal use, while the third seal forms a temporary seal. This temporary seal may be selectively formed between the valve stem, the bonnet member and the lower stem for temporarily sealing the valve assembly. This allows the permanent seals to be replaced when necessary without decommissioning the valve assembly. This third seal is not under compression during normal operation of the valve assembly but is only compressed when the lower valve stem is drawn upwardly and backseated to compress the third seal against the bonnet.

DESCRIPTION OF THE PREFERRED EMBODIMENT

Figure 1:
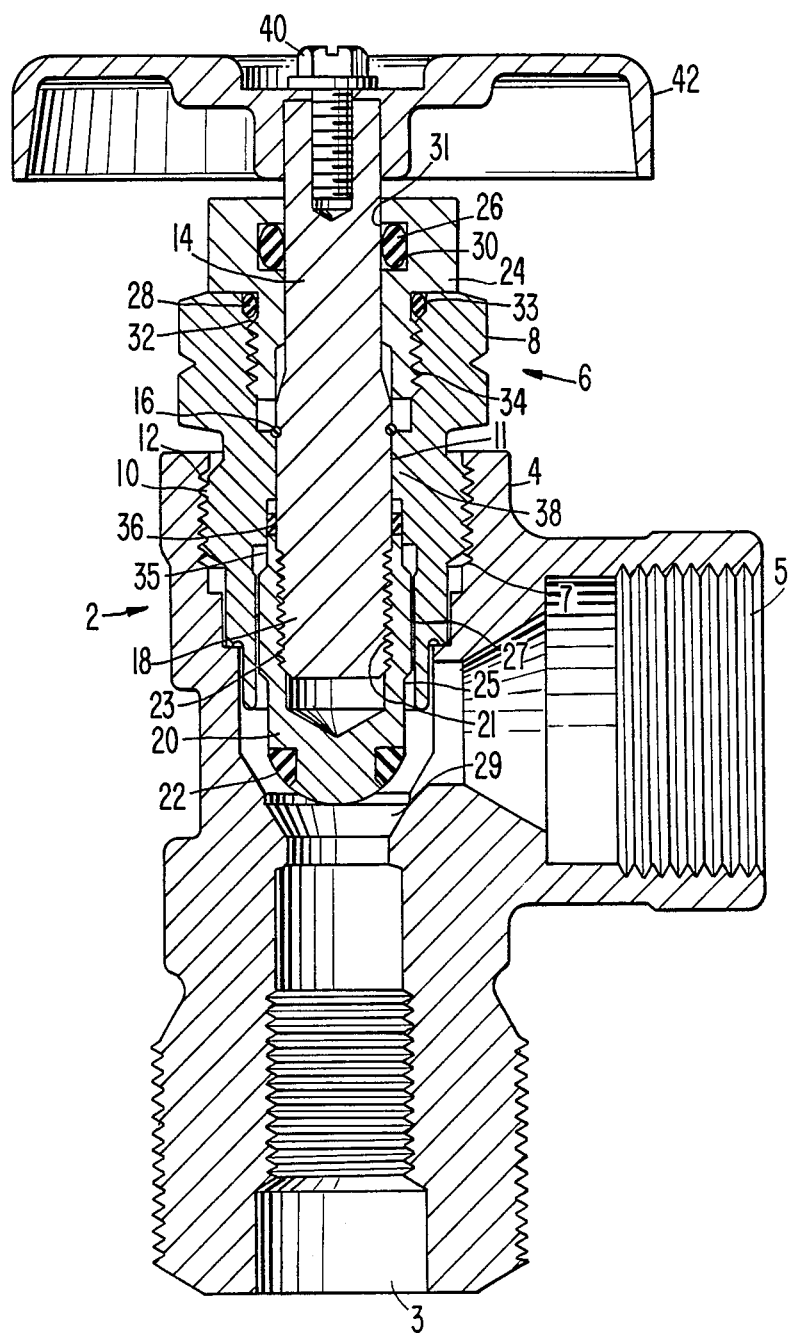
FIG. 1 is a sectional elevational view of the non-rising stem valve assembly according to the present invention, in a normal open operating condition.
Figure 2:
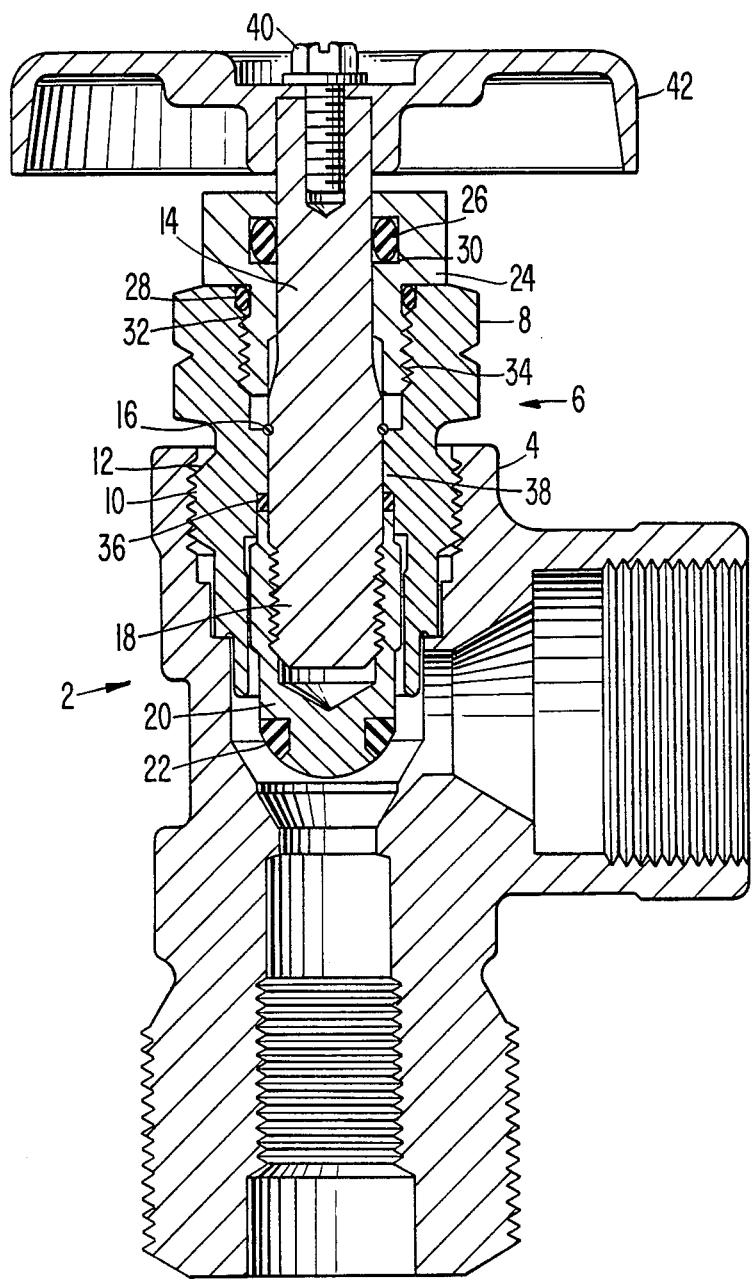
FIG. 2 is a sectional elevational view of the non-rising stem valve assembly according to the present invention in the replacement position.

Referring to FIGS. 1 and 2, there is shown a valve assembly 2 including a valve body 4 and a valve assembly 6. The valve body has valve ports 3 and 5, and the flow of fluid or other material between these valve ports is controlled by the valve assembly 6. The valve body also includes an internally threaded valve receiving opening 7 which is longitudinally aligned with the valve port 3. The valve assembly 6 includes a bonnet 8 having external threads 10 thereon which cooperate with internal threads 12 of the valve receiving opening 7 to secure the valve assembly 6 therein. A non-rising valve stem 14 passes through a central opening 11 in the bonnet 8 and is rotatable relative to the bonnet but maintained in a fixed axial position by a retaining ring 16. The non-rising valve stem 14 is provided with an externally threaded lower end portion 18 which cooperates with a separate, internally threaded lower valve stem 20. The lower end portion 18 is threaded into a central threaded passage 21 in the lower valve stem 20; the cooperating threads being indicated in broken lines at 23. The lower valve stem 20 is non-rotatably maintained within a lower open end 25 of the bonnet 8 and is axially movable relative to the non-rising valve stem upon rotation of the valve stem 14. Rotation of the lower valve stem is prevented by a key and groove arrangement with the bonnet at 27, or by any known means found in the art. The lower valve stem 20 is additionally provided with a disc seal 22 embedded in its lower portion which engages a seat 29 in the valve body to close the port 3 when the valve assembly 2 is in a closed or shutoff condition.

A packing nut 24 having a central opening 31 through which the non-rising valve stem 14 passes, is provided for forming a replacable packing seal between the bonnet 8 and the non-rising valve stem 14. The packing nut is threaded into an open end 33 of the bonnet 8, and the non-rising stem valve passes through the packing nut and into the bonnet. The replacable packing seal includes first and second O-ring seals 26, and 28. The first O-ring seal 26 is accommodated within a recess 30 on the internal surface of the packing nut 24, thereby forming a fluid-tight seal between the non-rising stem valve 14 and the packing nut 24. The second O-ring seal 28 is provided on the external surface of the packing nut 24 within a recess 32 provided therein. This second O-ring seal 28 forms a second fluid tight seal between the bonnet 8 and the packing nut 24. The packing nut 24 is threadedly secured within the bonnet 8 by threads 34 so as to compress the O-ring 28 between the packing nut 24 and the bonnet 8.

The first O-ring seal 26 is subjected to stress during the opening and closing of the valve due to the rotation of the stem 14. Because of such stress, periodic replacement of O-ring seal 26 is required. In order to replace the O-ring seal 26 without decommissioning the valve, a resilient washer 36 is provided around the valve stem 14 and between the lower valve stem 20 and the bonnet 8. The washer 36 is loosely disposed in a cavity defined by a flange 38, the valve stem 14 and the lower end 25 of the bonnet. As the lower valve stem 20 is moved into this cavity, an upper portion 35 thereof is moved into contact with the washer 36 and then simultaneously moves the washer within the cavity as the lower valve stem moves. Upon rotation of the valve stem 14, and the complete raising of lower valve stem 20 to a backseated position, the washer contacts a flange 38 of the bonnet 8, and is compressed to form a temporary seal between the valve stem 14, the lower valve stem 20 and the bonnet 8, as shown in FIG. 2. With the lower valve stem 20 in the completely raised state and the washer 36 forming the temporary seal, a bolt 40 threaded into the upper end of the valve stem may be removed and a knob 42 which it holds may be lifted off to gain access to the packing nut 24. Since the temporary seal is made, the packing nut 24 can be removed and the O-ring 26 replaced without the loss of any product nor the need to decommission the valve itself for any period of time.

During normal operation of the valve assembly 2, the resilient washer 36 is not compressed or subjected to internal fluid pressure which would cause the washer to wear and require replacement. Rotation of the stem 14 by the knob 42 in one direction causes the lower valve stem 20 to move upwardly due to the threads 23 and to move the disc seal 22 away from the seat 29 to open the valve. However, to open the valve, there is no need to rotate the valve stem 14 until the lower valve stem 20 moves all the way to the backseated position where the washer 36 is engaged and compressed. This never occurs during normal valve operation.

To close the valve, the valve stem 14 is rotated in the opposite direction until the disc seal 22 engages the valve seat 29.

Figure 3:
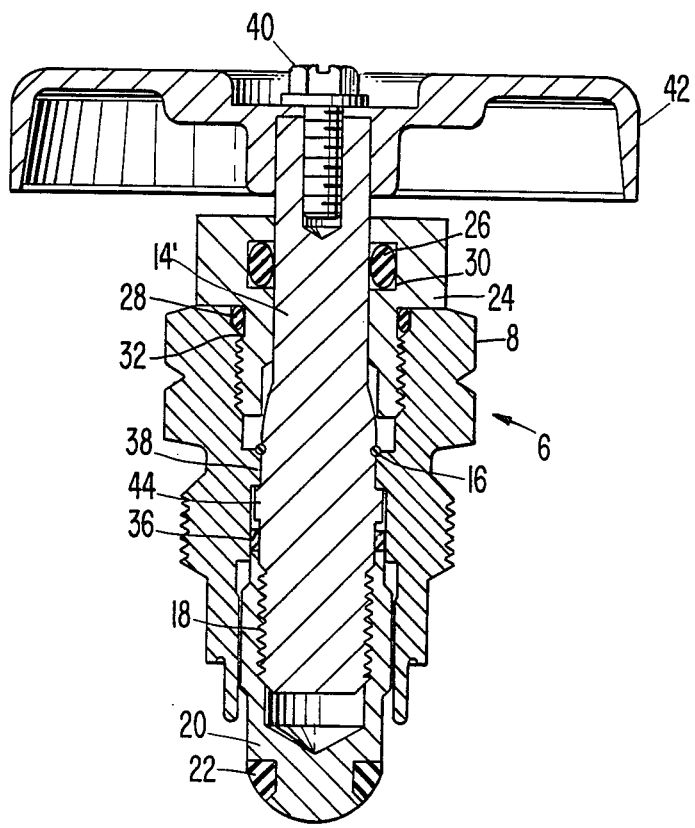
FIG. 3 is a sectional elevational view of the non-rising stem valve according to a second embodiment of the present invention.

Illustrated in FIG. 3, is a variation of the valve disclosed above with reference to FIGS. 1 and 2, but the principle of its use is identical. Like reference numerals will be used in FIG. 3 for structural elements which are identical in structure and function to those shown in FIGS. 1 and 2. The valve of FIG. 3 includes a valve stem 14 having a radially extending flange 44 positioned below the flange 38 of the bonnet 8. Therefore, when the lower valve stem 20 is completely raised, the resilient washer 36 contacts flange 44 and is compressed to form a temporary seal between the valve stem 14 and the bonnet 8. The combination of the flange 38 and flange 44 positively prevents the valve stem 14 from rising relative to the bonnet 8.

The foregoing is a description of illustrative embodiments of the invention, and those skilled in the art will appreciate that numerous modifications may be made of the invention without departing from its spirit. Therefore, it is intended that the scope of this invention be determined by the appended claims and their equivalents.

I claim:

1. A non-rising stem valve assembly comprising a bonnet adapted for attachment to a valve body, said bonnet including an upper end, a lower end and a central passageway extending through said bonnet between the upper and lower ends thereof, a valve stem extending through the upper end of said bonnet into said passageway and having a stem lower end within said passageway, means for securing said valve stem within said bonnet for rotational movement but against movement in the direction of said upper and lower ends, packing means disposed in the upper end of said bonnet for providing a seal between said valve steam and said bonnet, a lower valve portion means mounting said lower valve portion on said stem lower end for axial movement relative to said valve stem between a valve closed position and a valve open position and between the valve open position and a backseat position, said backseat position being closest to the upper end of said bonnet, said lower valve portion having an upper extremity which extends into said passageway at the lower end thereof and a lower extremity for movement outwardly beyond the lower end of said bonnet, said passageway being widened adjacent the lower end of said bonnet to receive said lower valve portion which engages said bonnet within said passageway, said passageway being narrowed to form a radially extending flange spaced a distance above said lower valve portion to create a cavity between said valve stem and said bonnet below said radially extending flange, and a sealing means loosely positioned in said cavity and extending between said valve stem and said bonnet in all positions of said lower valve portion to provide a substantial seal, said sealing means being normally uncompressed when said lower valve portion is in said valve closed and valve open positions, said sealing means being compressed into sealing engagement with said bonnet and said valve stem by said upper extremity of said lower valve portion when said lower valve portion is moved to the backseat position so that the upper extremity of said lower valve portion moves into said cavity and engages and simultaneously moves said sealing means within said cavity to the backseat position to compress said sealing means between said bonnet passageway and valve stem to create a seal between said valve stem and bonnet, whereby said packing means can be removed from said bonnet for repair or replacement.

2. The non-rising stem valve of claim 1, wherein said sealing means is movable axially of said bonnet.

3. The non-rising stem valve of claim 1, wherein the upper extremity of said lower valve portion moves into said cavity to the backseat position to engage and compress said sealing means between said radially extending flange, bonnet passageway and valve stem to create a seal between said valve stem and bonnet.

4. The non-rising stem valve of claim 1, wherein said valve stem includes an outward projecting stem shoulder which extends beneath the radially extending flange in said bonnet, said sealing means being mounted in said cavity beneath said stem shoulder, the upper extremity of said lower valve portion moving into said cavity as said lower valve portion is moved to the backseat position to engage and compress said sealing means between said stem shoulder, bonnet passageway and valve stem to create a seal between said valve stem and bonnet.

5. The non-rising stem valve of claim 4, wherein said stem shoulder is in engagement with said radially extending flange.

6. The non-rising stem valve of claim 1, wherein said packing means includes a packing nut removably secured within said passageway at the upper end of said bonnet, said packing nut having an exterior surface and a central channel defined by an interior surface, said central channel extending through said packing nut, the valve stem extending through said central channel, said packing nut including a first seal means on said interior surface to create a seal between said valve stem and said packing nut and a second seal means on the exterior surface to create a seal between said bonnet and said packing nut.

7. The non-rising stem valve of claim 6, wherein said packing nut includes a first radial recess on said interior surface for receiving said first seal means and a second radial recess on said exterior surface for receiving said second seal means.

8. The non-rising stem valve of claim 6, wherein said radially extending flange is formed in said passageway below said packing nut, said means for securing said valve stem within said bonnet against movement in the direction of said upper and lower ends of the bonnet including lateral projecting means projecting outwardly from said valve stem between said radially extending flange and said packing nut.

9. The non-rising stem valve of claim 8, wherein said lateral projecting means includes a retaining ring secured to said valve stem and engaging said radially extending flange.

10. The non-rising stem valve of claim 8, wherein said valve stem includes an outward projecting stem shoulder which extends beneath the radially extending flange in said bonnet, said sealing means being mounted in said cavity beneath said stem shoulder, the upper extremity of said lower valve portion moving into said cavity as said lower valve portion is moved to the backseat position to engage and compress said sealing means between said stem shoulder, bonnet passageway and lower valve portion to create a seal between said lower valve portion and bonnet.

11. The non-rising stem valve of claim 10, wherein said stem shoulder is in engagement with said radially extending flange.

* * * * *